United States Patent [19]

Eguchi

[11] 4,406,235

[45] Sep. 27, 1983

[54] ELECTRONIC SEWING MACHINE

[75] Inventor: Yasukata Eguchi, Kunitachi, Japan

[73] Assignee: Janome Sewing Machine Co. Ltd., Tokyo, Japan

[21] Appl. No.: 304,973

[22] Filed: Sep. 23, 1981

[30] Foreign Application Priority Data

Oct. 2, 1980 [JP] Japan .......................... 55-139703[U]

[51] Int. Cl.³ ............................................. D05B 3/02
[52] U.S. Cl. ................................................ 112/158 E
[58] Field of Search ............... 112/158 E, 158 F, 258, 112/121.11, 121.12, 275, 277

[56] References Cited

U.S. PATENT DOCUMENTS 4,052,946 10/1977 Rydz et al. ..................... 112/158 E
4,203,378 5/1980 Giesselmann et al. .......... 112/158 E
4,236,469 12/1980 Takenoya et al. .............. 112/158 E
4,335,667 6/1982 Beckerman et al. ............. 112/158 E Primary Examiner—Peter P. Nerbun
Attorney, Agent, or Firm—Michael J. Striker

[57] ABSTRACT

An electronic sewing machine is provided with a number of outer changeable control panels attachable to the housing of the sewing machine. Each of the control panels carries a number of patterns and indices printed thereon and a plurality of operating elements adjacent to the corresponding patterns and indices. The sewing machine further includes an electronic control circuit adapted to operate the switch forming instrumentalities of the sewing machine in accordance with the patterns on the selected control panel attached to the machine housing.

5 Claims, 6 Drawing Figures

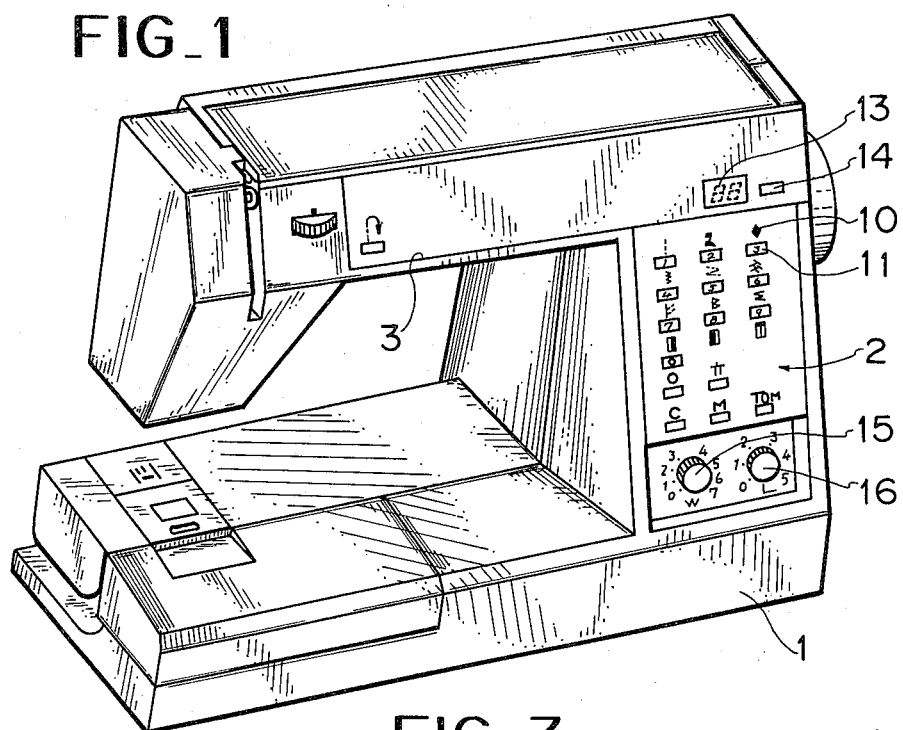
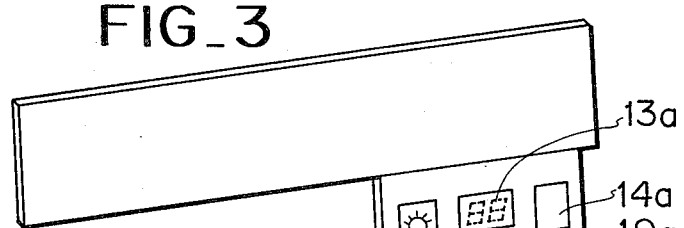
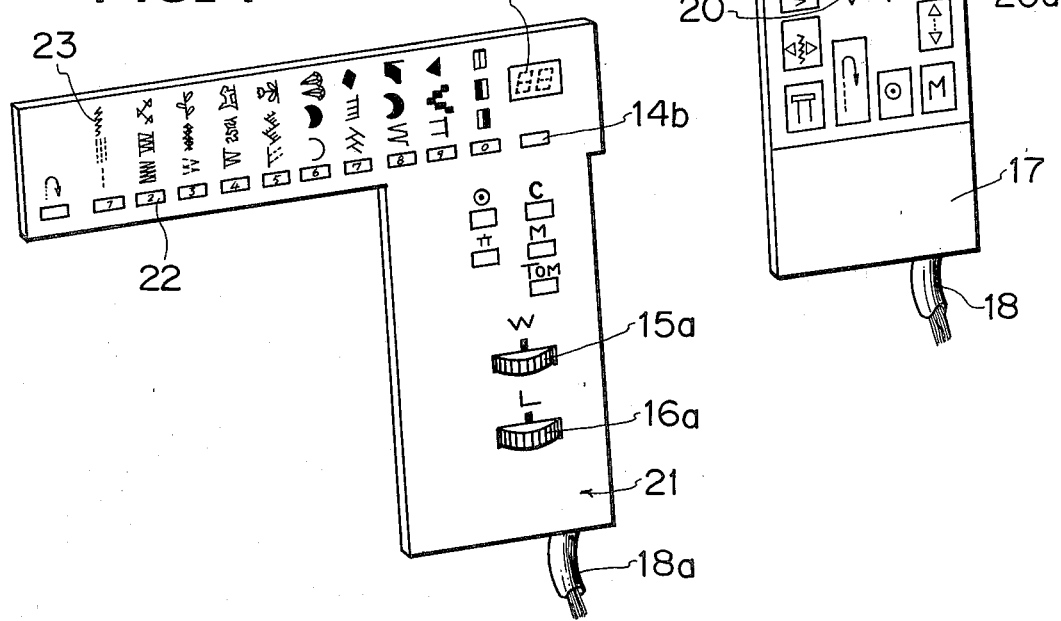

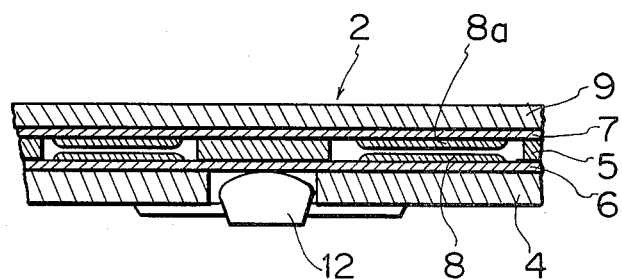
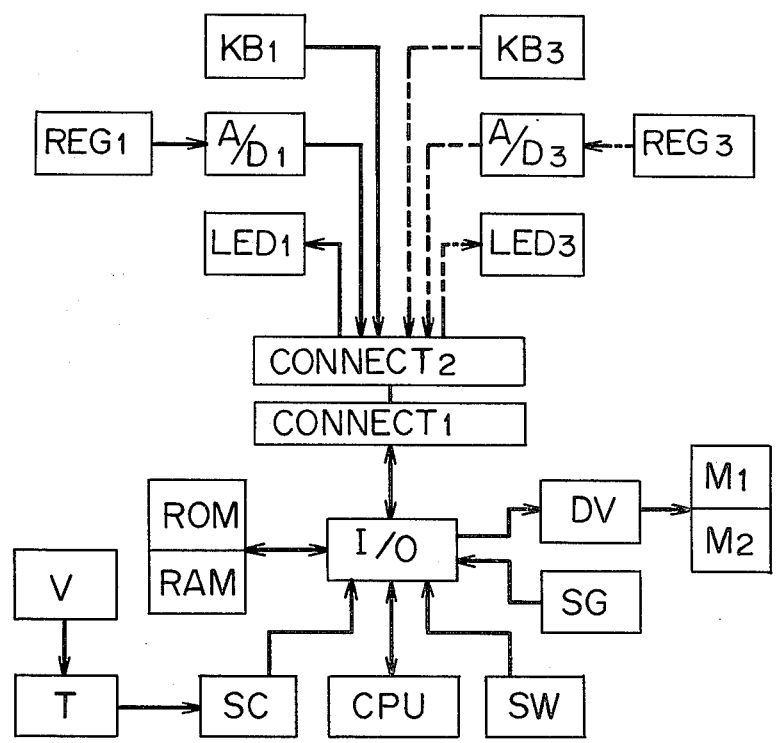

FIG_6
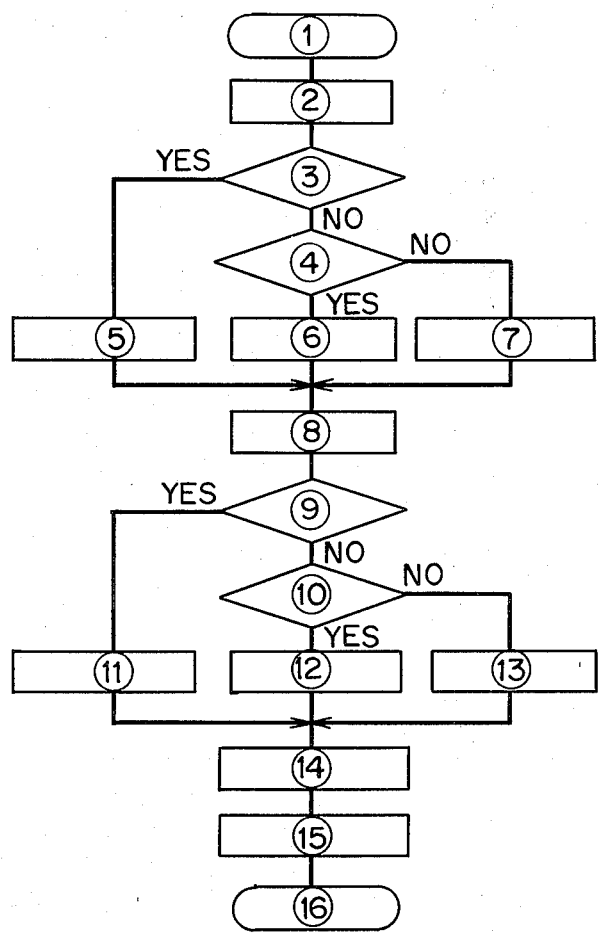
1: Start
2: Read out of SW
3: SW at first stage
4: SW at second stage
5: Conversion of KB1, A/D1
6: Conversion of KB2, A/D2
7: Conversion of KB3, A/D3
8: Data processing
9: SW at first stage
10: SW at second stage
11: Translation to LED1
12: Translation to LED2
13: Translation to LED3
14: Cutout to LED1 - LED3
15: Main programing
16: RET

ELECTRONIC SEWING MACHINE

BACKGROUND OF THE INVENTION

The invention relates to a sewing machine, and more particularly relates to an electronic sewing machine having an electronic memory storing stitch control data which are sequentially read out to control the needle position and the fabric feed to form patterns of stitches. It is generally required for a sewing machine producer to provide different types of sewing machines in domestic as well as foreign trade in accordance to the desires of destinations. It is therefore desirable and efficient for a sewing machine producer to produce a single basic sewing machine and a plurality of control panels of different types and designs which may be selectively attached to the basic sewing machine for the purpose of satisfying the desires of the destinations to which the sewing machines are shipped, instead of producing each of so many complete products of different types and designs.

Nowadays the electronic sewing machines have generally come to be highly developed, and actually have many stitching functions which have never been attained by the mechanical sewing machines of cam control. Accordingly the electronic sewing machines have so many operating parts including controlling and adjusting elements provided on the front face thereof even to a degree that the design of sewing machine is so complex and intricate that the machine operator feels more or less perplexed how to manipulate the sewing machine. It is, however, a fact that in dependence upon the individuals and destinations some prefer a sewing machine of simple functions and of simple design, and some prefer a sewing machine of more functions and of more elaborate design. Heretofore it has therefore been necessary for a sewing machine producer to provide so many types of sewing machines at the expense of so much cost to meet the desires of consumers.

A SUMMARY OF THE INVENTION

The invention has been provided to eliminate the defects and disadvantages of the prior art. It is therefore a primary object of the invention to provide a sewing machine having an electronic control device which may be commonly used in combination with a number of differently specified control panels each selectively mounted on the sewing machine and accessible to the machine operator to actually operate the sewing machine. It is another object of the invention to provide a sewing machine and a number of control panels which may be selectively and easily mounted to the sewing machine.

For attaining these objects, the invention substantially comprises a sewing machine incorporated at least with stitch forming instrumentalities including a needle vertically and laterally reciprocated to penetrate a fabric to be sewn and a fabric feeding device for transporting the fabric relative to the needle, an electronic memory storing stitch control data selectively and sequentially read out to control the stitch forming instrumentalities for producing stitches in the fabric, an electronic control device, a plurality of control panels each selectively mounted to the sewing machine, said control panels being specified partly different from each other to provide different stitching functions, different designs in selective combination of the sewing machine, said control panels each having provided thereon a number of pattern selecting switches each manually operated to produce an electric signal, stitch adjusting dials, if required, each manually operated to produce an electric signal indicating the operation degree of the adjusting dial, indicating parts operated in response to the signals of the pattern selecting switches and of the stitch adjusting dials to electrically indicate a selected pattern or the like to be stitched and a selected function of the sewing machine, said control panels being each of the same configuration and of the same dimensions so as to be selectively mounted to the same sewing machine and electrically connected to said electronic control device which is operated to control the sewing machine in accordance with the signals of the operating parts of the control panel specifically connected to the control device, said electronic control device including a changeover switch which is accessible to the machine operator and is manually and selectively operated to set the electronic control device in a condition to respond to the signals from the control panel.

The other features and advantages of the invention will be apparent from the following description of a preferred embodiment in reference to the attached drawings, in which;

BRIEF DESCRIPTION OF THE DRAWINGS

FIG. 1 is a perspective view of a sewing machine incorporated with the invention;

FIG. 2 is a partial sectional view of a control panel of the invention;

FIG. 3 is a perspective view of a control panel of one type in accordance with the invention;

FIG. 4 is a perspective view of another type of the control panel in accordance with the invention;

FIG. 5 is a block diagram of a control circuit of the invention; and

FIG. 6 is a flow chart of control in accordance to the invention.

DETAILED DESCRIPTION OF THE INVENTION

In reference to FIG. 1, a sewing machine has a housing 1 having a panel 2 arranged on the front face thereof in such a manner as to cover an opening 3 of the housing 1. As shown in FIG. 2, the panel 2 consists of an electrically nonconductive transparent front sheet 9 and a support plate 4, which is spaced from the front sheet 9 by spacers 5 and has a print circuit (not shown) formed on one side thereof. As shown the panel 2 has a plurality of film contacts 8, 8a secured to the support plate 4 and the front sheet 9 opposite to each other. The film contacts 8, 8' are substantially made of a carbon paste. The front sheet 9 has a plurality of patterns 10 and indices 10 printed thereon and many operating parts 11 provided each adjacent to the corresponding patterns and indices. These operating parts 11 are selectively pushed to short-circuit the corresponding film contacts 8, 8a, thereby to produce a short-circuit signal which is applied to the print circuit.

As shown in FIGS. 1 and 2, a number of light emitting diodes 12, though only one is illustrated, produce upon receiving an indication signal from the print circuit a light to indicate the patterns 10 to be stitched or indices 10 representing the stitching modes through the transparent front sheet 9. The panel 2 has a 7-segment indicating device 13 which is made operative and inoperative by manipulation of a ten-key changeover switch 14. When the 7-segment indicating device 13 is operative, the specific ten 0–9 of the pattern selection operating parts 11 are used as so many ten-keys to be selectively operated to indicate two-figure numbers in the indicating device 13 for the purpose of selecting the corresponding patterns provided separately from the patterns 10 indicated on the panel 2. A needle position adjusting device including an operating knob 15 and a variable resistor (not shown) is mounted on the support plate 4, and a fabric feed adjusting device including an operating knob 16 is mounted on the same plate.

Another panel 17 as shown in FIG. 3 is of a type different from the panel 2 of FIG. 1, and may be attached to the sewing machine in place of the panel 2. The panel 17 has an electric connector 18 (which is not illustrated with respect to the panel 2) which is the end of a lead extended from a print circuit of the panel 17 to be connected to a control part of the sewing machine as will be described hereinlater. A ten-key changeover switch 14a is manipulated to make operative operating parts 19, 19a and 20, 20a, which are selectively operated to indicate the numbers 0–9 in two-figure numbers in a 7-segment indicating device 13a for the purpose of selecting the corresponding stitch patterns provided separately from the patterns indicated on the panel. The operating parts 19, 19a are used to progressively increase the numbers, and the operating parts 20, 20a, are used to progressively decrease the numbers. The panel 17 is not provided with a needle position adjusting device and a fabric feed adjusting device each corresponding to the devices 15, 16 in FIG. 1.

Still another panel 21 in FIG. 4 is of a type further different from those of the panels 2, 17 and may be attached to the sewing machine in place of the panels 2, 17. A number of indicated patterns 23 are divided in groups each of which has a single operating part 22. Each of the operating parts 0–9 is initially operated to select a first one of the patterns of the group and repeatedly operated to select different one of the patterns. These operating parts 0–9 are used as so many ten keys when a ten key changeover switch 14b is operated, and the number is indicated in a two-figure number at a 7-segment indicating device 13b to select the corresponding one of the patterns which are provided separately from the groups of patterns 23 which are selected by operation of the operating parts 0–9. The panel 21 has also a needle position adjusting device W including an operating dial 15a and a fabric feed adjusting device L including an operating dial 16a. An electric connector 18a is extended out from a print circuit (not shown) provided on the rear side of the panel 1.

In reference to FIG. 5 showing a block diagram of a control circuit of the invention, the arrow marks show signal or data flowing directions. V is an A.C. power source, T is a power source transformer and SC is a control power source circuit. ROM is an electronic read-only memory storing pattern stitch control signals and program control signals to be designated by operation of the operating parts provided on the panel 2, 17 or 21. CPU is a central processing unit for implementing various program controls. RAM is an electronic random-access memory for temporarily memorizing the processes and results of the program controls made by the CPU. I/O is an input and output port. The ROM, CPU, RAM and I/O constitute a microcomputer. M1 is a control motor for controlling the position of the needle of the sewing machine. M2 is a control motor for controlling a fabric feed of the sewing machine. DV is a drive device for driving the control motors M1, M2. SG is a synchronizer operated in synchronism with rotation of a main drive shaft of the sewing machine to produce a synchronizing signal. SW is a 3-stage changeover switch selectively operated to properly set the central processing unit CPU in dependence upon the panel 2, 17, or 21 to be employed. The aforementioned parts are all arranged in the sewing machine housing 1 and constitute an electronic control device.

Further in reference to FIG. 5, CONNECT1 is a connector on the side of the electronic control device in the sewing machine housing 1. The CONNECT1 is connected to another CONNECT2 representing the connector 18 of panel 17 or 18a of 21 which may be selectively attached to the machine housing 1 as shown in FIG. 1. KB1 is a key board to produce a signal upon a selective manipulation of the operating parts of the panel 2 attached to the sewing machine housing 1, and accordingly upon a selective contact of the film switches 8 and 8a of the panel as shown in FIG. 2. REG1 is a part to produce a signal upon a selective manipulation of the needle position or fabric feed adjusting device 15 or 16. A/D1 is an analong-digital converter to change into digital values the manipulation degrees of the adjusting device 15 or 16. LED1 is an electric indicating device including the light emitting diodes 12 for selectively indicating the patterns 10 of the panel 2 and the 7-segment indicating device 13 as shown in FIGS. 1 and 2. The aforementioned parts are related to each other as shown by arrow marks and are connected to the connector CONNECT1 of the electronic control device of sewing machine through the connector CONNECT2 on the side of the pannel 2.

Further in reference to FIG. 5, KB3 is a key board to produce a signal upon a selective manipulation of the operating parts 22 of the panel 21 which may be employed in place of the panel 2. REG3 is a part to produce a signal upon a selective manipulation of the needle position or a fabric feed adjusting dial 15a, or 16a of panel 21. A/D3 is an analog-digital converter for changing into digital values the manipulation degrees of the operating dial 15a or 16a. LED3 is an electric indicating device including the light emitting diodes for selectively indicating the patterns 23 and the 7-segment indicating device 13b. These parts are all related as shown by imaginary arrow marks, and are connected to the connector CONNECT1 of the electronic control device of the sewing machine through the connector CONNECT2 of the pannel 21.

As to the panel 17 in FIG. 3, the conditions are substantially same as those of the panels 2, 21 except for nonexistence of a needle position and a fabric feed adjusting devices REG1 or REG3 on the side of the panel 17.

Thus the panels 2, 17, 21 are selectively attached to the opening 3 of the machine housing 1 and connected to the electronic control device of the sewing machine as shown in FIG. 1. Then if the 3-stage changeover switch SW is set to one of the three stages in dependence upon one of the three panels employed, the program control is carried out by the microcomputer including the central processing unit CPU in response to the manipulation of the panel 2, 17 or 21.

In reference to FIG. 6 showing a control flow chart of the invention, if a program control is started after the power source V is applied, the position of the changeover switch SW is read out. If the switch SW is located at the first stage thereof, it is discriminated that the panel 2 is attached to the sewing machine. Then the central processing unit CPU receives the signals of the signal producing parts KB1, REG1 due to a selective manipulation of the operating parts 11 and of the adjusting parts 15, 16, and converts these signals into the words common to the panels 2, 17, 21. Namely, if the same pattern is selected by manipulation of the operating parts of the panels 2, 17, 21, the same pattern selecting code is provided. Then the data processing is carried out on the basis of the signals of the signal producing parts KB1, REG1 so as to indicate the pattern to be stitched and to actually control the stitches of the pattern to be formed. If the changeover switch SW is located at the second or the third stage, it is discriminated that the panel 17 or 21 is employed. If the panel 21 is employed and the switch is located at the third stage, the CPU receives the signals of the signal producing parts KB3, REG3 and converts the signals into the common words, and the data processing is carried out for indication of a selected pattern to be stitched and for controlling the stitches of the pattern to be formed. Then a specific indicating place is identified in accordance with manipulation of an operating part to indicate a selected pattern at the electric indicating device LED1, LED2 or LED3, and then a main program is implemented to read out the stitch control signals sequentially from the memory ROM with a synchronizing signal of the synchronizer SG while a data conversion is included, thereby to give an output to the drive device DV for controlling the needle position control motor M1 and the fabric feed control motor M2. Then the program is reset to the starting point START to repeatedly drive the control motors.

What is claimed is:

1. A sewing machine having a housing, stitch forming instrumentalities disposed in said housing and including a needle vertically and laterally reciprocated to penetrate a fabric to be sewn and a fabric feeding device for transporting the fabric relative to the needle, and electronic memory for storing stitch control data selectively and sequentially reading out said data to control the stitch forming instrumentalities, the sewing machine comprising a plurality of interchangeable control panels, said housing being formed with an opening, said control panels being attachably-removable and selectively mounted on said housing to cover up said opening, each of said control panels including a number of operating elements having at least pattern selecting switches, signal producing means operative in response to a selective manipulation of said operating elements to produce electric signals, and indicating means operative in response to said electric signals to electrically indicate a selected pattern, said control panels being partly and electrically differently specified from each other in accordance with selected patterns; and electronic control means mounted in said housing and electrically connected to the selected control panel and operative to control the stitch forming instrumentalities in accordance with the signals received from the selected control panel; said electronic control means including changeover switch means positioned in said housing and switched over to a predetermined position corresponding to a selected control panel and adapted to set said electronic means in a condition to respond to the signals from said selected control panel.

2. A sewing machine as defined in claim 1, wherein said control panels have the same configuration and the same dimensions.

3. The sewing machine as defined in claim 1, wherein said electronic control means includes an electronic read-only memory for storing pattern stitch control signals and program control signals from said operating elements on the selected panel, a central control processing unit for implementing various program controls, and an electronic random-access memory for temporarily memorizing the processes and results of the program controls made by said control processing unit.

4. The sewing machine as defined in claim 3, wherein each of said control panels includes a front sheet carrying said operating elements and a support plate spaced from said front sheet and connected thereto.

5. The sewing machine as defined in claim 4, wherein said front sheet and said support plate include a number of oppositely positioned film contacts, the respective operating elements on the selected panel being selectively pushed to short-circuit the respective film contacts to produce electric signals in said signal producing means.

* * * * *